United States Patent
Harland et al.

(10) Patent No.: US 9,588,565 B1
(45) Date of Patent: Mar. 7, 2017

(54) METHOD AND APPARATUS FOR DATA PROTECTION ON EMBEDDED FLASH DEVICES DURING POWER LOSS EVENTS

(71) Applicant: EMC Corporation, Hopkinton, MA (US)

(72) Inventors: Jason A. Harland, Allston, MA (US); Joseph E. Fenton, Uxbridge, MA (US); Adrianus Djohan, South Grafton, MA (US); Paul F. Provost, Thompson, CT (US)

(73) Assignee: EMC IP Holding Company LLC, Hopkinton, MA (US)

( * ) Notice: Subject to any disclaimer, the term of this patent is extended or adjusted under 35 U.S.C. 154(b) by 52 days.

(21) Appl. No.: 13/930,977

(22) Filed: Jun. 28, 2013

(51) Int. Cl.
*G06F 11/00* (2006.01)
*G06F 1/28* (2006.01)
*G06F 11/20* (2006.01)
*G06F 11/34* (2006.01)

(52) U.S. Cl.
CPC ............ *G06F 1/28* (2013.01); *G06F 11/2015* (2013.01); *G06F 11/34* (2013.01)

(58) Field of Classification Search
CPC ... G06F 1/28; G06F 1/30; G06F 1/305; G06F 1/3206; G06F 11/30; G06F 11/34; G06F 11/075; G06F 11/0754; G06F 11/0766; G06F 11/0772; G06F 11/1441; G06F 11/2015; G06F 11/0751
USPC .......................................................... 714/22
See application file for complete search history.

(56) References Cited

U.S. PATENT DOCUMENTS

| 8,065,562 B2 * | 11/2011 | Wilson ...................... G06F 1/30 714/22 |
| 8,325,554 B2 * | 12/2012 | Sweere ............... G06F 12/0866 365/185.08 |
| 2011/0066872 A1 * | 3/2011 | Miller ...................... G06F 1/30 713/340 |

* cited by examiner

*Primary Examiner* — Michael Maskulinski
*Assistant Examiner* — Anthony J Amoroso
(74) *Attorney, Agent, or Firm* — Krishnendu Gupta; Robert Kevin Perkins; Andre Gibbs (57) ABSTRACT

Example embodiments of the present invention relate to a method, an apparatus, and a computer program product for providing secondary power to allow shutdown of a device during a power loss. The method includes monitoring an input power attribute for a data storage device. Upon detection of an anomaly in the input power attribute for the data storage device indicative of a power loss, the method includes providing secondary power to the data storage device for temporary operation of the device to power down.

13 Claims, 8 Drawing Sheets

METHOD AND APPARATUS FOR DATA PROTECTION ON EMBEDDED FLASH DEVICES DURING POWER LOSS EVENTS

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to backup power and more specifically to providing secondary power to allow shutdown of a device during a power loss event.

BACKGROUND

Traditional flash devices are subject to data loss and data corruption upon power loss events. Potential power losses include critical system failures to input power, failure of AC line, and failure of an upstream device.

SUMMARY

Example embodiments of the present invention relate to a method, an apparatus, and a computer program product for providing secondary power to allow shutdown of a device during a power loss. The method includes monitoring an input power attribute for a data storage device. Upon detection of an anomaly in the input power attribute for the data storage device indicative of a power loss, the method includes providing secondary power to the data storage device for temporary operation of the device to power down.

BRIEF DESCRIPTION OF THE DRAWINGS

The above and further advantages of the present invention may be better under stood by referring to the following description taken into conjunction with the accompanying drawings in which.

DETAILED DESCRIPTION

Example embodiments of the present invention provide a signaling mechanism and power hold up to flash devices for power losses, including unexpected (i.e., surprise) power losses.

Figure 1:
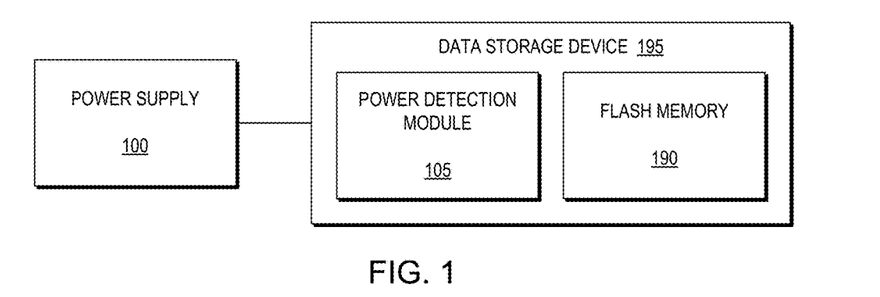
FIG. 1 is a simplified block diagram illustrating a power detection module according to an example embodiment of the present invention.

FIG. 1 is a simplified block diagram illustrating a power detection module 105 according to an example embodiment of the present invention. The power detection module may be configured to provide secondary power to the data storage device 195 for temporary operation of the data storage device 195, including its storage medium (e.g., flash memory 190) to power down. Therefore, example embodiments of the present invention allow graceful power down of the data storage device 195 to prevent data loss and data corruption upon power loss events, such as at the power supply 100. As illustrated in FIG. 1, the power detection module 105 may part of a data storage device 195 (e.g., a PCIe board); however, it should be understood that the power detection module 105 may be external to the data storage device 195.

Figure 2:
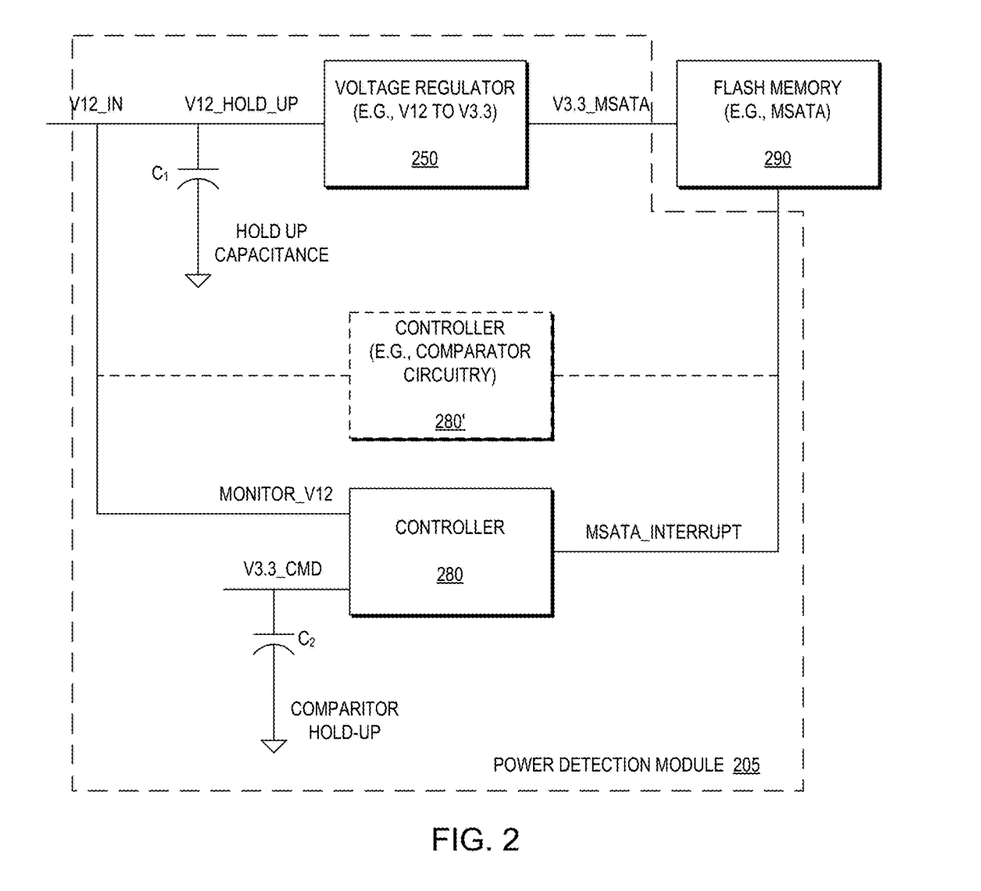
FIG. 2 is a simplified schematic drawing illustrating a power detection module according to an example embodiment of the present invention.

FIG. 2 is a simplified schematic drawing illustrating a power detection module 205 according to an example embodiment of the present invention. At illustrated in FIG. 2, the power detection module 205 is configured to provide data protection for embedded flash memory 290 during power loss events. It should be understood that, without the power detection module 205, data resident within the data storage device (e.g., 195 of FIG. 1), including NAND memory (not shown), is subject to loss or corruption during power loss events.

Figure 3:
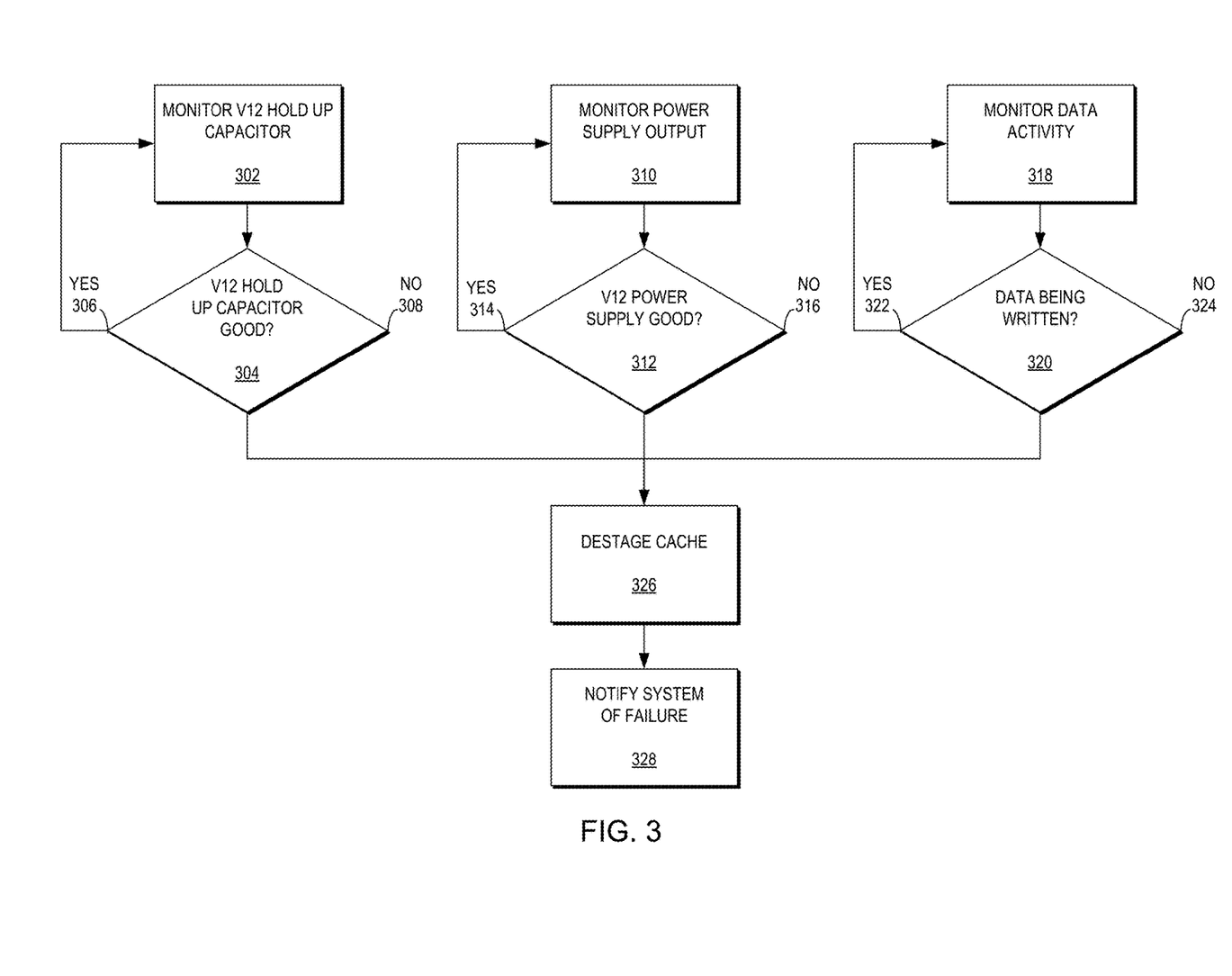
FIGS. 3-4 are flow diagrams illustrating methods according to example embodiments of the present invention.

The simplified circuit schematic of FIG. 2 may be studied in conjunction with FIG. 3 which is a flow diagram illustrating a method according to an example embodiment of the present invention. In the example embodiment illustrated in FIG. 2, the flash memory 290 is powered V12_IN by 12V "high side" capacitance $C_1$ (e.g., hold up capacitance) in front of a voltage regulator 250. In this example embodiment, the voltage regulator 250 drops the power supply voltage from 12V to 3.3 V for the flash memory 290. A controller 280 (e.g., in hardware or software) is configured to monitor a data storage device attribute (e.g., health of a secondary power source, activity of the data storage device, and input voltage) and detect an anomaly in the data storage device attribute indicative of a power loss.

For example, as illustrated in FIG. 3, the controller 280 may monitor the hold up capacitor $C_1$ (302) and determine whether it is good (i.e., if it is able to hold adequate charge) (304). If the controller 280 determines that the hold up capacitor $C_1$ is able to maintain adequate charge (306), the controller 280 may continue to monitor the hold up capacitor (302). Otherwise, if the controller 280 determines that the hold up capacitor $C_1$ is unable to maintain adequate charge (308), the controller 280 may cause the data storage device to destage its cache to flash memory 290 (326). Optionally, the controller may notify the data storage device (e.g., 195 of FIG. 1) of the failure/anomaly (328). Additionally, the controller 280 may detect that data being written to the data storage device has stopped, which may be indicative of a power failure at the data storage device, or a drop in input voltage to the data storage device (310). As a result of detecting such an anomaly, the controller may trigger destaging of data to the data storage device.

Similarly, as illustrated in FIG. 3, the controller 280 may monitor the power supply output (310) and determine whether the power supply is good (i.e., if it is able to provide adequate power) (312). If the controller 280 determines that the power supply (100 of FIG. 1) is able to provide adequate power (314), the controller 280 may continue to monitor the hold up capacitor (302). Otherwise, if the controller 280 determines that the power supply is unable to provide adequate power (316), the controller 280 may cause the data storage device to destage its cache to flash memory 290 (326). Optionally, the controller may notify the data storage device (e.g., 195 of FIG. 1) of the failure/anomaly (328).

Additionally, as illustrated in FIG. 3, the controller 280 may monitor data activity being written to the flash memory 290 (318) and determine whether data is being written to the flash memory 290 (320), which may be indicative of a power failure at the data storage device. If the controller 280 determines that data is still being written (322), the controller 280 may continue to monitor data activity (318). Otherwise, if the controller 280 determines that data is no longer being written (324), the controller 280 may cause the data storage device to destage its cache to flash memory 290 (326). Optionally, the controller may notify the data storage device (e.g., 195 of FIG. 1) of the failure/anomaly (328), or a drop in input voltage to the data storage device (310). As a result of detecting such an anomaly, the controller may trigger destaging of data to the data storage device.

In certain embodiments, as illustrated in FIG. 2, the controller 280' may include comparator circuitry to determine the anomaly (e.g., capacitor failure, power loss, write failures). For a power loss, such power failure may be detected near instantaneously. However, in other embodiments, the controller 280 may be a combination of hardware and software and, in such embodiments, a second hold up capacitor $C_2$ may be provided to provide a sufficient amount of secondary power for the controller to operate long enough to detect the power loss and trigger destaging of data to the data storage device. In certain embodiments, the controller 280 may provide a specific signal (e.g., MSATA_INTERRUPT) through a GPIO pin to the flash memory 290. In other embodiments, the controller 280' may use an in-band mechanism by disconnecting a serial ATA link to the flash memory 290. As described above, the hold up capacitor $C_1$ then provides power hold up to the flash memory 290 to gracefully power down to prevent data loss or corruption.

In embodiments where the power detection module 105 is part of the data storage device, in a preferred embodiment, circuitry of the power detection module 105 (as will be described below with respect to FIGS. 2 and 6) should be placed next to mSATA devices on PCIe board to reduce etch-related power loss. Also, it should be understood that the power detection module 105 may be scalable, meaning that the ratio of power detection modules to flash memory 290 devices could be 1: or 1:MANY with additional capacitance to support additional flash memory 290 devices.

Figure 4:
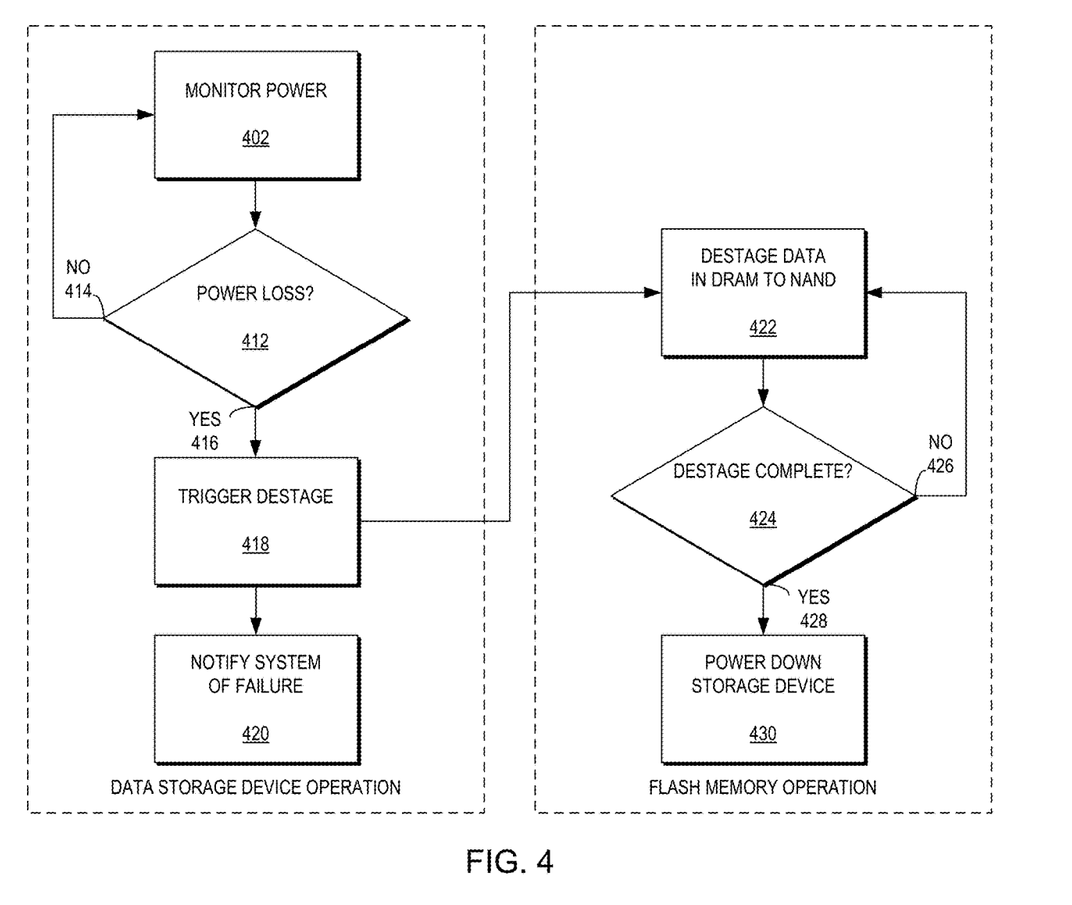

FIG. 4 is a flow diagram illustrating a method according to an example embodiment of the present invention. The flow diagram of FIG. 4 may be studied in conjunction with FIG. 5 which is a graph illustrating a signal, input power (i.e., V12_IN), and secondary power (i.e., STORED CHARGE) during operation of a data storage device according to an example embodiment of the present invention.

Figure 5:
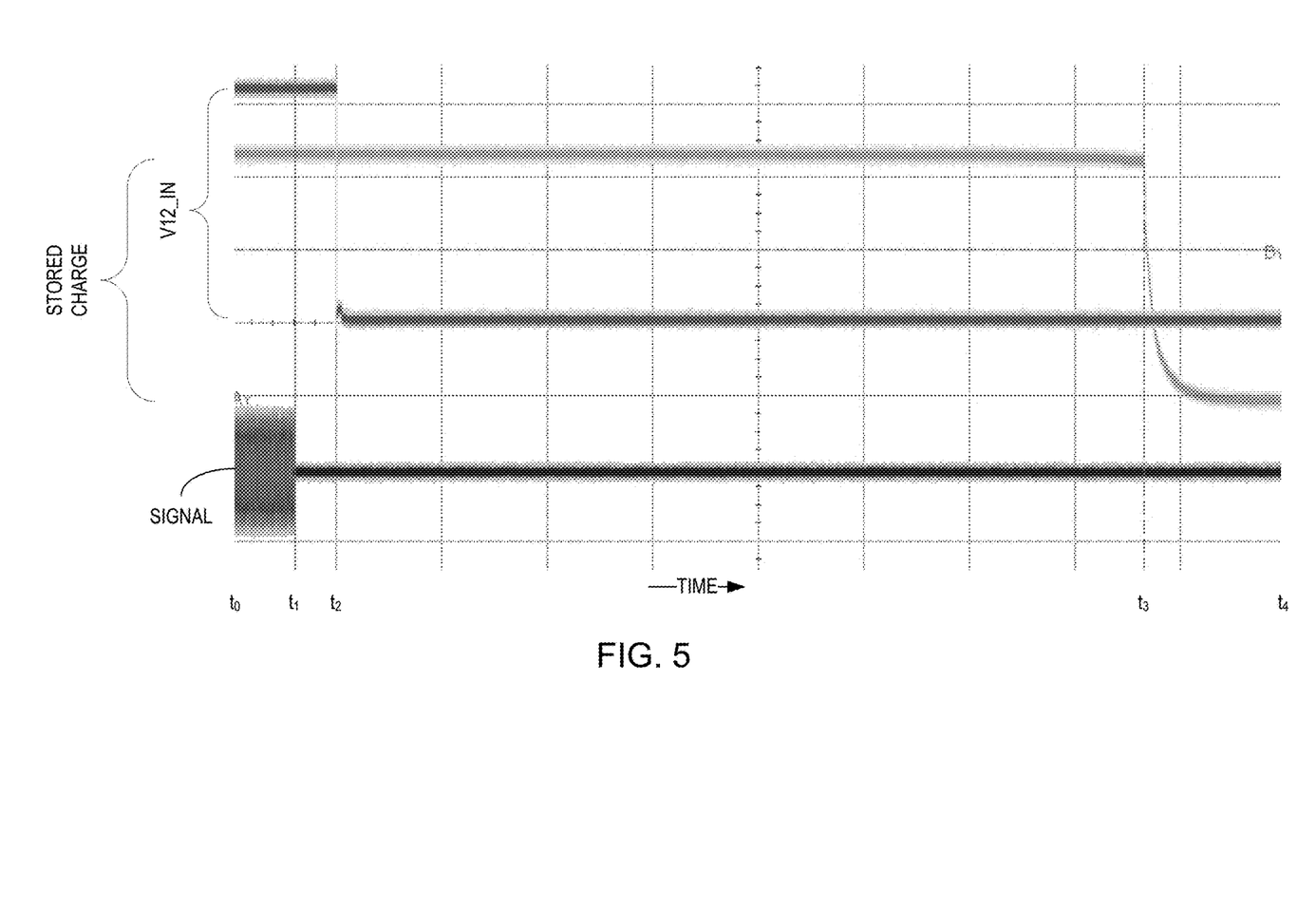
FIG. 5 is a graph illustrating a signal, input power, and secondary power during operation of a data storage device according to an example embodiment of the present invention.

At time $t_0$, the controller 280 may monitor the input power V12_IN (402) to determine whether there is a power loss (412). From $t_0$ up to $t_2$ there is no power loss (414). However, at $t_2$ a power loss is detected (416). Alternatively, the controller 280 may infer from the loss of signal at $t_1$ that there has been a power loss. The controller 280 then may trigger destaging of data (418).

The data storage device then may destage data from cache (e.g., DRAM) to nonvolatile NAND flash memory (422).

The flash memory 290 then may determine whether destaging is complete (424). If it is not complete (426), the flash memory 290 may continue to destage data (422). Otherwise, if destaging is complete (428), the storage device may power down (430). It should be understood that the hold up capacitor $C_1$ may be chosen such that the charge that hold up capacitor $C_1$ provides from the power failure at $t_2$ to its drop off at $t_3$ is sufficient for the data storage device to destage all of its data from cache to flash. In other words, in a preferred embodiment, the capacitance is large enough that the hold up capacitor $C_1$ does a capacitive decay through the voltage regulator 250 to maintain a consistent voltage (e.g., 3.3V) to drive the flash memory 290 and, after adequate time for flash memory 290 to prepare itself to power down (i.e., destage data), the voltage regulator 250 clamps voltage off and brings rail to ground at time $t_4$.

It should be understood that there may be an internal controller (not shown) embedded in the flash memory 290 that reads signals from a SATA link loss pin or other GPIO, sees a trigger, and internally shuts off input to the flash memory 290. The internal flash controller than may flush internal DRAM cache to permanent NAND flash using the standby power as described above with respect to FIGS. 2-5. The internal flash controller then may commit data to the permanent NAND memory and may validate/verify that the data is written. The internal flash controller then may shuts off NAND channels and shuts down rest of the system drives.

Figure 6:
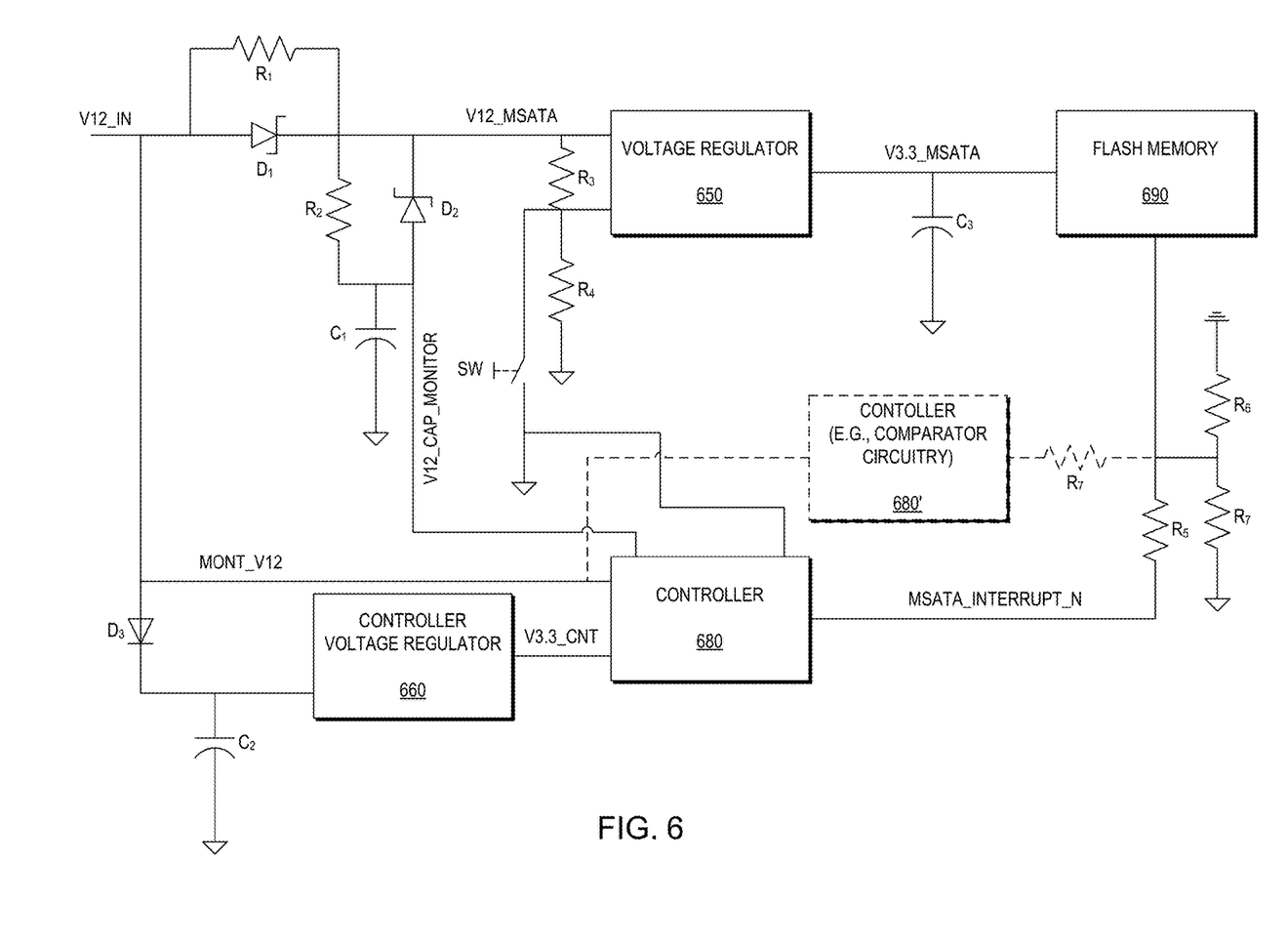
FIG. 6 is a schematic drawing illustrating a power detection module according to an example embodiment of the present invention.

FIG. 6 is a schematic drawing illustrating a power detection module (e.g., 205 of FIG. 2) according to an example embodiment of the present invention. As illustrated in FIG. 6, a controller 680, as described above with respect to FIGS. 2-4, provides signaling to tell the flash memory 690 to stop accepting writes and to destage data in cache to flash memory. It should be understood that the comparator circuitry of the power detection module also may include diodes to isolate the comparator circuitry from main system power rail. In other words, in a preferred embodiment, holdup capacitance is isolated from the rest of the system so it only provides power to desired resources. It also should be understood that resistors may be needed according to implementation-specific requirements (e.g., prevent overcharging capacitor or driving too much current to it to prevent upstream circuit breakers upstream to trip via a voltage spike). Similarly, Additionally, the hold up capacitor $C_1$ may be isolated via a decoupling capacitor $C_3$ (implementation specific) to filter voltage. Moreover, a switch (SW) may provide a hard reset that resets the flash memory 690 the voltage regulator 650. It should be understood that the comparator circuitry of the power detection module may operate at any voltage range and may be in a power supply monitoring input voltage on AC line for loss or in any kind of storage drive, including a SSD with embedded cache.

Figure 7:
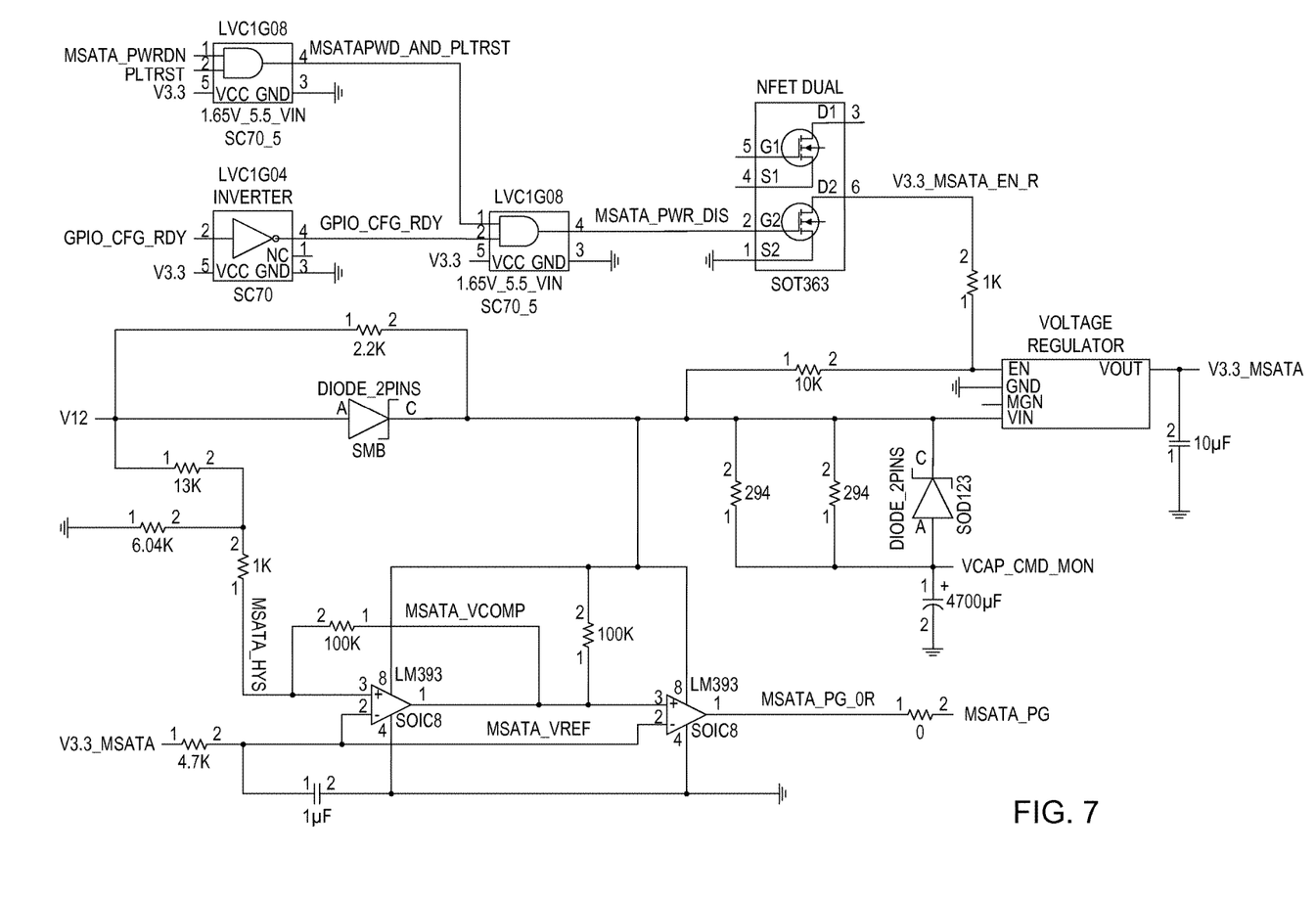
FIG. 7 is a schematic diagram illustrating a holdup circuit according to an example embodiment of the present invention.

FIG. 7 is a schematic diagram illustrating a holdup circuit according to an example embodiment of the present invention. As illustrated in FIG. 7, comparator circuitry detects voltage levels that signifies to a storage device that there is a loss to 12V input. The operational amplifiers toward the bottom of the schematic monitor the input and if the voltage falls below a threshold below 12 V, the operational amplifiers send a signal (MSATA_PG) to the storage device to destage its cache. The top branch of the schematic allows hard power cycle of drive.

Figure 8:
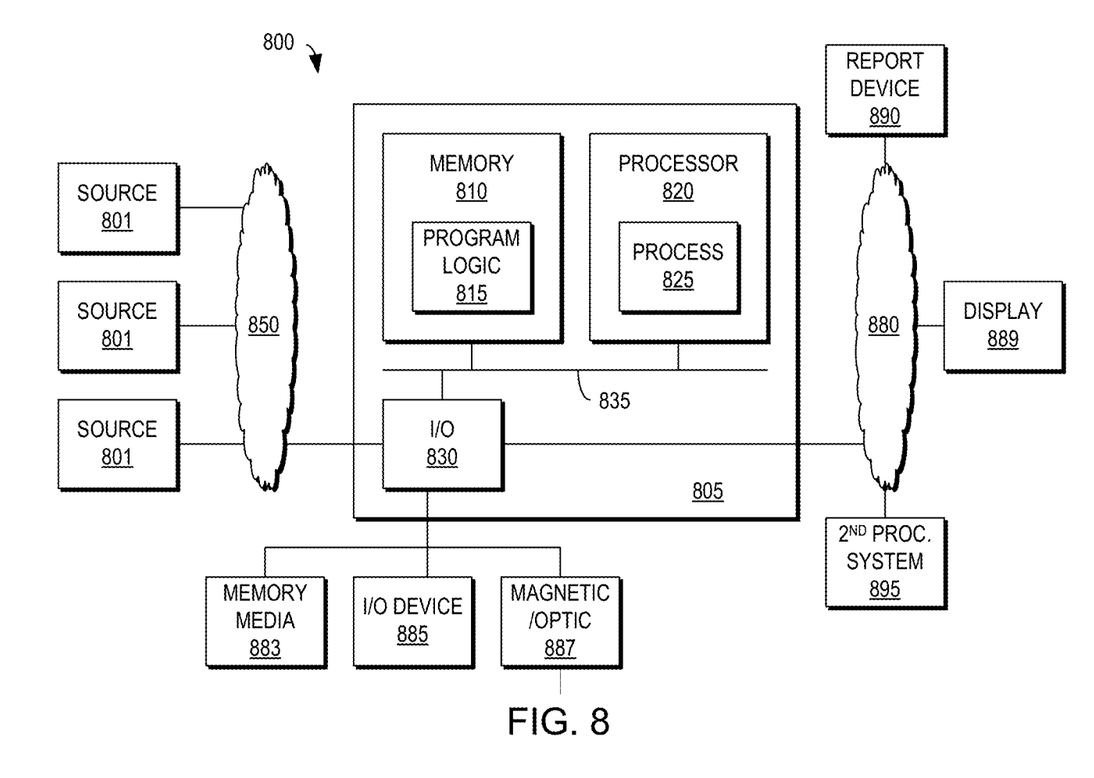
FIG. 8 is a block diagram illustrating an apparatus according to an example embodiment of the present invention.

FIG. 8 is a block diagram of an example embodiment apparatus 805 according to the present invention. The apparatus 805 may be part of a system 800 and includes memory 810 storing program logic 815, a processor 820 for executing a process 825, and a communications I/O interface 830, connected via a bus 835.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 8, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 9:
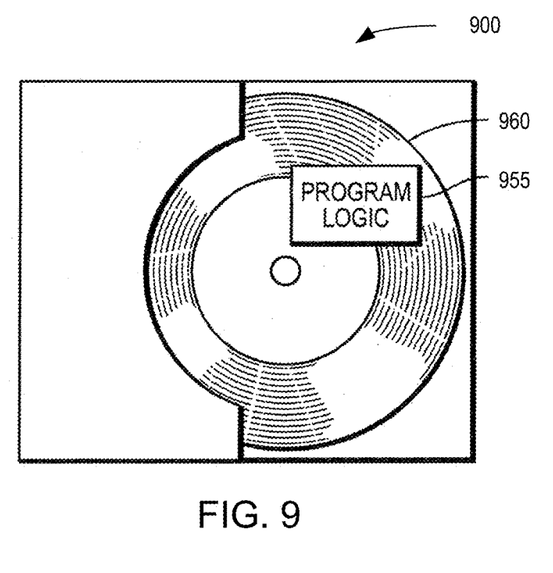
FIG. 9 is an illustration of an apparatus as embodied in program code according to an example embodiment of the present invention.

FIG. 9 shows program logic 955 embodied on a computer-readable medium 960 as shown, and wherein the logic 955 is encoded in computer-executable code configured for carrying out the methods of this invention, thereby forming a computer program product 900.

The logic for carrying out the method may be embodied as part of the aforementioned system, which is useful for carrying out a method described with reference to embodiments shown. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A method comprising:
    monitoring, by a controller, signal activity of data being written to a data storage drive, by reading signals from a data link of the data storage drive, and monitoring an input voltage of a primary power source for the data storage drive, the data storage drive comprising a volatile cache memory and a nonvolatile storage medium and providing data storage for a data storage system, wherein at times data is stored in the volatile cache memory for destaging to the data storage drive nonvolatile storage medium;
    detecting, by a comparator of the controller, an anomaly in the monitored signal activity wherein the anomaly comprises a lack of signal activity of data being written to the data storage drive and a drop in the input voltage of the primary power source that is indicative of a power loss of the primary power source, wherein if data is not being written to the data storage drive, a power failure anomaly is detected;
    based upon the detected anomaly, triggering destaging of data from the data storage drive volatile cache memory to the data storage drive nonvolatile storage medium, and disconnecting a communication bus coupled to the data storage drive.

2. The method of claim 1 wherein triggering destaging data from the data storage drive volatile cache memory to the data storage drive nonvolatile storage medium comprises one of signaling the data storage drive and providing an in-band mechanism to detect the anomaly to trigger destaging of data from the data storage drive volatile cache memory to the data storage drive nonvolatile storage medium.

3. The method of claim 1 further comprising:
    providing secondary power to the data storage drive from a secondary power source disposed between a source of the input voltage and the data storage drive; and
    powering down the data storage drive.

4. The method of claim 3 wherein providing secondary power to the data storage drive from a secondary power source disposed between a source of the input voltage and the data storage drive comprises providing secondary power from the secondary power source until at least a time at which all data in the data storage drive volatile cache memory has been written to the data storage drive nonvolatile storage medium.

5. The method of claim 1 further comprising notifying a data storage system including the data storage drive of the anomaly.

6. A system comprising:
    a data storage drive comprising a volatile cache memory and a nonvolatile storage medium and providing;
    a controller configured to monitor signal activity of data being written to the data storage drive, the controller configured to read signals from a data link of the data storage drive, and to monitor an input voltage of a primary power source for the data storage drive, wherein at times data is stored in the volatile cache memory for destaging to the data storage drive nonvolatile storage medium, detect, via a comparator of the controller, an anomaly in the monitored signal activity wherein the anomaly comprises a lack of signal activity of data being written to the data storage drive and a drop in the input voltage of the primary power source that is indicative of a power loss of the primary power source, wherein if data is not being written to the data storage drive, a power failure anomaly is detected, based upon the detected anomaly, trigger destaging of data from the data storage drive volatile cache memory to the data storage drive nonvolatile storage medium, and disconnect a communication bus coupled to the data storage drive.

7. The system of claim 6 wherein the controller is further configured to, one or more of, signal the data storage drive and provide an in-band mechanism in response to detecting the anomaly to trigger destaging of data from the data storage drive volatile cache memory to the data storage device nonvolatile storage medium.

8. The system of claim 6 further comprising a secondary power source disposed between a source of an input voltage to the data storage drive and the data storage drive, wherein the controller is further configured to power down the data storage drive.

9. The system of claim 8 wherein the secondary power source is configured to provide secondary power until at least at time at which all data in the data storage drive volatile cache memory has been written to the data storage drive nonvolatile storage medium.

10. A computer program product including a non-transitory computer readable medium storage storing computer program code that when executed on a processor of a computer causes the computer to:
    monitor, by a controller, signal activity of data being written to a data storage drive, the controller configured to read signals from a data link of the data storage drive, and monitor an input voltage of a primary power source for the data storage drive, the data storage drive comprising a volatile cache memory and a nonvolatile storage medium and providing data storage for a data storage system, wherein at times data is stored in the volatile cache memory for destaging to the data storage drive nonvolatile storage medium;

detect, by a comparator of the controller, an anomaly in the monitored signal activity, wherein the anomaly comprises a lack of signal activity of data being written to the data storage drive and a drop in the input voltage of the primary power source that is indicative of a power loss of the primary power source, wherein if data is not being written to the data storage drive, a power failure anomaly is detected;

based upon the detected anomaly, trigger destaging of data from the data storage drive volatile cache memory to the data storage drive nonvolatile storage medium, and disconnect a communication bus coupled to the data storage drive.

11. The computer program product of claim 10, further comprising computer program code that when executed on a processor of a computer causes the computer to:

signal the data storage drive and provide an in-band mechanism to detect the anomaly to trigger destaging of data from the data storage drive volatile cache memory to the data storage drive nonvolatile storage medium.

12. The computer program product of claim 10, further comprising computer program code that when executed on a processor of a computer causes the computer to:

provide secondary power to the data storage drive from a secondary power source disposed between a source of the input voltage and the data storage drive; and power down the data storage drive.

13. The computer program product of claim 12, further comprising computer program code that when executed on a processor of a computer causes the computer to:

provide secondary power from the secondary power source until at least a time at which all data in the data storage drive volatile cache memory has been written to the data storage drive nonvolatile storage medium.

* * * * *